US007000123B2

(12) United States Patent
Mariaud et al.

(10) Patent No.: US 7,000,123 B2
(45) Date of Patent: Feb. 14, 2006

(54) DEVICE FOR AUTOMATICALLY CONTROLLING A VOLTAGE APPLIED TO A DATA CONDUCTOR IN A SERIAL LINK

(75) Inventors: Xavier Mariaud, Aix-En-Provence (FR); Daniel Klingelschmidt, Aix-En-Provence (FR)

(73) Assignee: STMicroelectronics SA, Montrouge (FR)

( * ) Notice: Subject to any disclaimer, the term of this patent is extended or adjusted under 35 U.S.C. 154(b) by 635 days.

(21) Appl. No.: 09/990,629

(22) Filed: Nov. 16, 2001

(65) Prior Publication Data

US 2002/0062456 A1 May 23, 2002

(30) Foreign Application Priority Data

Nov. 17, 2000 (FR) .................................. 00 14869

(51) Int. Cl.
*G06F 1/26* (2006.01)

(52) U.S. Cl. ...................... 713/300; 713/310; 713/330; 713/340; 710/15; 710/313; 710/314; 710/315

(58) Field of Classification Search ................ 713/300, 713/340, 310, 323, 324; 710/15, 313, 31
See application file for complete search history.

(56) References Cited

U.S. PATENT DOCUMENTS 5,027,002 A * 6/1991 Thornton ..................... 307/35
5,153,808 A * 10/1992 Juntunen et al. ........... 361/91.2
5,675,813 A * 10/1997 Holmdahl ................... 713/310
5,781,744 A * 7/1998 Johnson et al. ............. 710/304
6,000,042 A * 12/1999 Henrie ........................ 714/40
6,087,804 A * 7/2000 Suda .......................... 320/106
6,128,743 A * 10/2000 Rothenbaum ............... 713/300
6,253,329 B1 * 6/2001 Kang ......................... 713/300
6,289,397 B1 * 9/2001 Tsuyuguchi et al. ........... 710/1
6,415,342 B1 * 7/2002 Wahl et al. ................. 710/100
6,439,464 B1 * 8/2002 Fruhauf et al. ............. 235/492
6,516,418 B1 * 2/2003 Lee ........................... 713/320

(Continued)

FOREIGN PATENT DOCUMENTS

EP 0952530 10/1999

(Continued)

OTHER PUBLICATIONS

Patent Abstracts of Japan, vol. 2000, No. 11, Jan. 3, 2001 & JP2000224450A (Sanyo Electric Co. Ltd.), Aug. 11, 2000.

(Continued)

*Primary Examiner*—Lynne H. Browne
*Assistant Examiner*—Nitin C. Patel
(74) *Attorney, Agent, or Firm*—Lisa K. Jorgenson; Allen, Dyer, Doppelt, Milbrath & Gilchrist, P.A.

(57) ABSTRACT

A self-powered peripheral apparatus is connected upstream to another apparatus via a universal serial bus (USB), wherein one of the conductors of the USB provides a supply voltage to the self-powered peripheral apparatus. One of the two data conductors of the USB is connected to a voltage source of the self-powered peripheral apparatus. The self-powered peripheral apparatus includes a control device for controlling the data conductor supply for supplying the latter only if the supply voltage is present on the supply conductor. The control device includes a circuit for detecting the supply voltage and a logic circuit for controlling the regulator.

19 Claims, 4 Drawing Sheets

U.S. PATENT DOCUMENTS 6,546,450 B1 * 4/2003 Liu .................................. 710/316
6,563,866 B1 * 5/2003 Gutzmer .......................... 375/222
6,636,923 B1 * 10/2003 Meirsman et al. .......... 710/305
6,668,296 B1 * 12/2003 Dougherty et al. ......... 710/303
6,727,952 B1 * 4/2004 Hirata et al. ................ 348/372
6,760,852 B1 * 7/2004 Gulick ........................ 713/324
6,904,488 B1 * 6/2005 Matsumoto et al. ........ 710/313

FOREIGN PATENT DOCUMENTS

WO 00/67137 11/2000

OTHER PUBLICATIONS

Patent Abstracts of Japan, vol. 2000, No. 14, Mar. 5, 2001 & JP200035676A (Fuji Photo Film Co. Ltd.), Nov. 2, 2000.

* cited by examiner

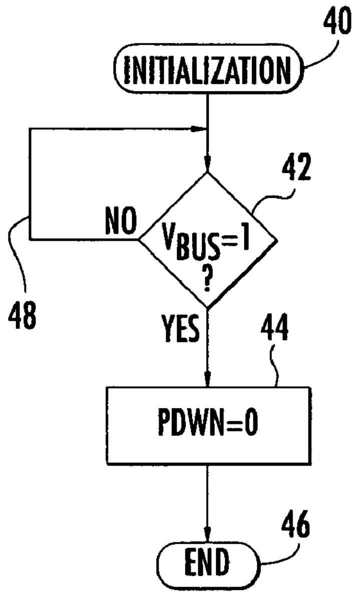
FIG. 2.
PRIOR ART
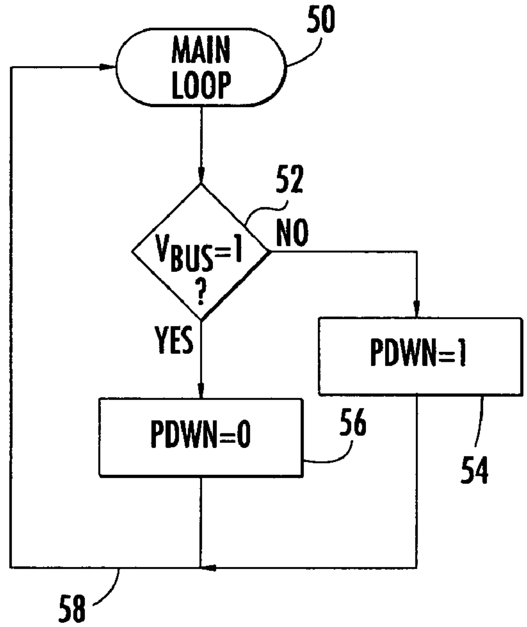
FIG. 3.
PRIOR ART
| VBUSSTAT | PDWN | STATE OF REGULATOR 26 |
|---|---|---|
| 0 | 0 | STOP |
| 0 | 1 | STOP |
| 1 | 0 | GO |
| 1 | 1 | STOP |
FIG. 4.
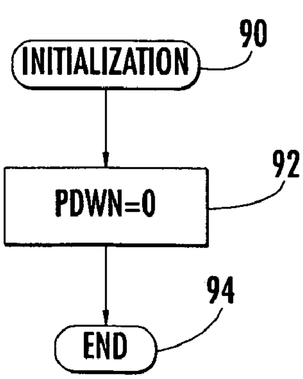
FIG. 5.

DEVICE FOR AUTOMATICALLY CONTROLLING A VOLTAGE APPLIED TO A DATA CONDUCTOR IN A SERIAL LINK

FIELD OF THE INVENTION

The present invention relates to a serial link cable between items of an electronic apparatus, and more particularly, to a universal serial bus (USB) connected to a voltage source for supplying power to an item of an electronic apparatus to which the cable is connected.

BACKGROUND OF THE INVENTION

A universal serial bus (USB) type serial link for connecting two items A and B of an electronic apparatus, as illustrated in FIG. 1, includes four conductor wires 10, 12, 14 and 16. These four conductor wires are identified as follows. The first conductor wire 10 is for a ground connection, the second conductor wire 12 is for a data line referred to as DM or D−, and the third conductor wire 14 is for a data line referred to as DP or D+. The fourth conductor wire 16 is connected to a five-volt (5V) voltage supply referred to as $V_{BUS}$.

These conductor wires 10, 12, 14 and 16 are connected at each end to respective connectors 18 and 20 of the male type, for example, which cooperate with female connectors 22 and 24 respectively attached to apparatus A and apparatus B. In this way, apparatus A can supply power to apparatus B with the voltage $V_{BUS}$ by conductor wire 16.

Apparatus B includes a resistor Rr, referred to as a pull-up resistor, which connects conductor DP or DM to the power supply conductor. The value of this resistor Rr determines the communication speed (data rate) of apparatus B. Specifically, the communication speed is high if connected to DP or low if connected to DM.

Apparatus B comprises an internal power supply source, as shown by reference 26 symbolizing a voltage regulator for supplying a regulated voltage $V_{CC}$ of 3.3 volts. The output terminal of this source 26 is connected to the pull-up resistor Rr. This power supply source 26 is derived either from the voltage $V_{BUS}$ or from an external voltage $V_{DD}$ at an input terminal 28.

The specifications of the USB require that the power supply source 26 for the pull-up resistor Rr be derived from or controlled by the power supply $V_{BUS}$ such that when the voltage $V_{BUS}$ is not present, the pull-up resistor does not supply a current to the data conductor DP or DM to which it is connected. This applies only to the items of apparatus B powered by $V_{DD}$, i.e., those that are not powered by $V_{BUS}$.

This specification results from the fact that the absence of $V_{BUS}$ signifies that apparatus A is in a non-operating state (e.g., off) and, in that state, the voltage regulator 26 would supply a current to apparatus A which could risk damaging the latter. Accordingly, apparatus B must detect the presence of $V_{BUS}$ for supplying the pull-up resistor Rr only in the case where $V_{BUS}$ is present.

Detection of $V_{BUS}$ is obtained by a program of a microcontroller MC for apparatus B. The terminal $V_{BUS}$ is connected to the input terminal of a Schmitt trigger type of electronic device 30 whose output terminal commands the state of a latch 32 belonging to a register 34, specifically with a 1 logic state for $V_{BUS}$ present and a 0 logic state for $V_{BUS}$ absent. In addition, the switching on or off of the regulator 26 is controlled by the state of a latch 36 belonging to a command register 38, specifically with a 1 logic state for the regulator in the OFF state and a 0 logic state for the regulator in the ON state.

The microcontroller program includes periodically reading the state of the state latch 32, and setting latch 36 to the 0 logic state (regulator 26 is ON) only in the case where latch 32 is in the 1 logic state ($V_{BUS}$ is present).

When apparatus B is switched on, the regulator 26 must only be switched on in the presence of $V_{BUS}$. This is achieved by an initialization phase of the microcontroller in accordance with the flow chart of FIG. 2. After initialization of apparatus B, represented by operation 40, the microcontroller reads the latch 32. During the following operation 42, it compares the state of that latch with the 1 logic state. In the case of a positive comparison, it sets latch 36 to the 0 logic state (PDWN=0) by operation 44, which concludes the initialization by the End state 46. In the case of a negative comparison, the microcontroller performs a new loop 48.

Once this initialization is carried out, the program 50 (FIG. 3) of the microcontroller MC periodically checks that the voltage $V_{BUS}$ is present by reading the state of the latch 32 and comparing it, by operation 52, with the 1 logic state corresponding to the presence of $V_{BUS}$. In the case of a negative comparison, latch 36 is set to the 1 logic state (PDWN=1) by operation 54, with the regulator 26 being switched off. In the case of a positive comparison, latch 36 is set to the 0 logic state by operation 56 (PDWN=0), with the regulator 26 being maintained in the on state.

The above described approach satisfy the specification requirements for the USB, but consume microcontroller processing time since the state of the terminal $V_{BUS}$ must be frequently checked.

SUMMARY OF THE INVENTION

An object of the present invention is to provide an automatic monitoring of the input terminal $V_{BUS}$ while avoiding the regular and frequent intervention of the microcontroller program.

The invention relates to a device for automatically controlling a voltage $V_{cc}$ applied to one of two data conductors DP, DM of a USB type serial link cable in a peripheral apparatus B connected upstream to another apparatus A. The peripheral apparatus B comprises a supply voltage source which supplies the applied voltage $V_{CC}$ to the data conductor DP or DM, and is susceptible of receiving on another conductor a supply voltage $V_{BUS}$.

The device includes a detection circuit for detecting the supply voltage $V_{BUS}$, and a memory circuit for storing a state of the supply voltage $V_{BUS}$. A logic control circuit controls the supply source producing the voltage $V_{CC}$ to set into operation the supply source only in the presence of the supply voltage $V_{BUS}$.

BRIEF DESCRIPTION OF THE DRAWINGS

Other characteristics and advantages of the present invention shall become more apparent from the following description of a specific exemplary embodiment, the description being given in conjunction with the appended drawings in which:

FIGS. 2 and 3 are flow charts illustrating operation of a device according to the prior;

FIG. 4 is a logic truth table in accordance with the present invention;

FIG. 5 is a flow chart illustrating the automatic initialization phase of a device in accordance with the present invention;

DETAILED DESCRIPTION OF THE PREFERRED EMBODIMENTS

Figure 1:
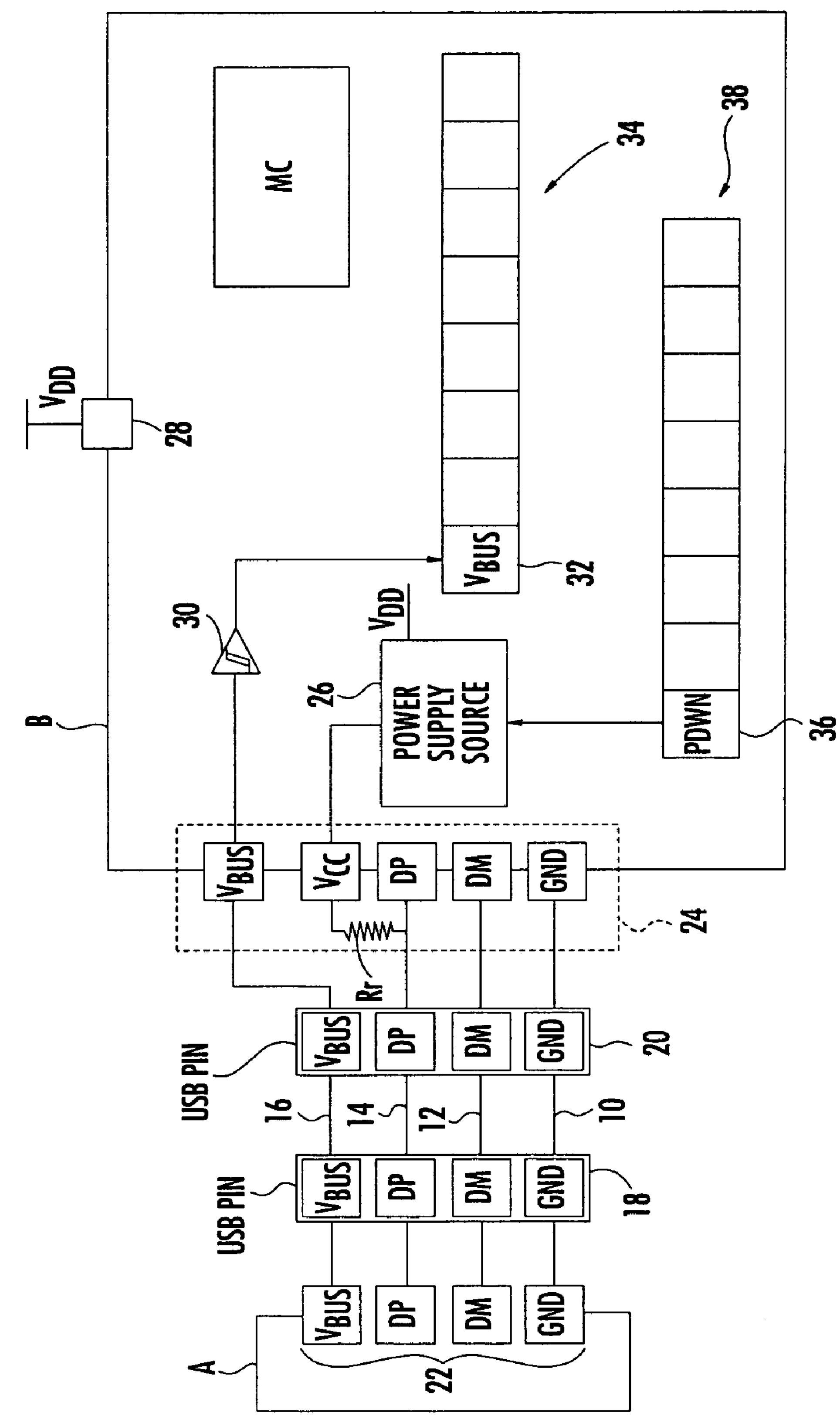
FIG. 1 is a diagram showing a USB link between two items of electronic apparatus A and B according to the prior art.
Figure 6:
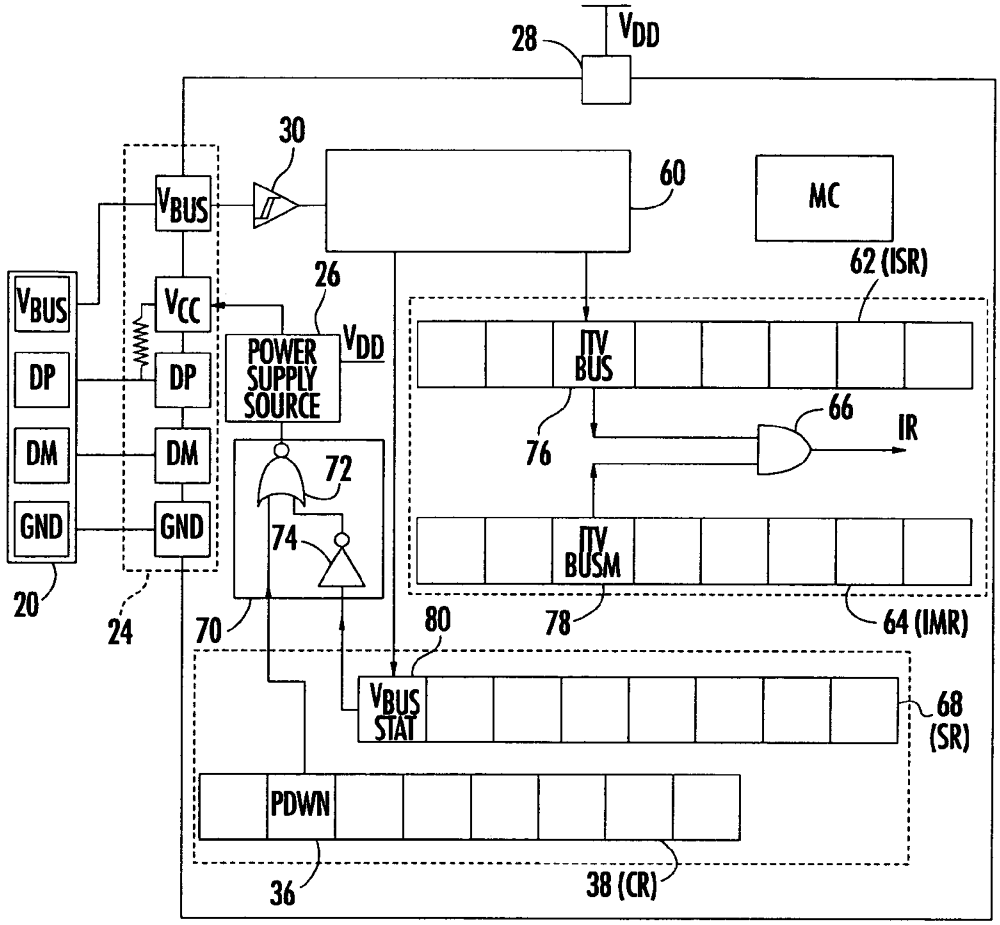
FIG. 6 is an electronic circuit diagram showing the automatic device in accordance with the present invention.

In the figures, like references designate like elements performing the same functions. FIGS. 1–3 illustrate the prior art which has been described above. The automatic device for controlling the regulator 26 comprises the following elements as best illustrated in FIG. 6. A detection circuit 60 detects the presence or absence of the voltage $V_{BUS}$ on the corresponding terminal $V_{BUS}$ of pin 24. A logic circuit 70 controls the regulator 26. A latch 36 controls register 38 of the microcontroller MC, and a latch 80 is for a state register 68 of the microcontroller MC. A latch 76 is for an interrupt state register 62 of the microcontroller MC, and a latch 78 is for an interrupt mask register (IMR) 64 of the microcontroller MC. The automatic device also includes an AND logic circuit 66.

Figure 7:
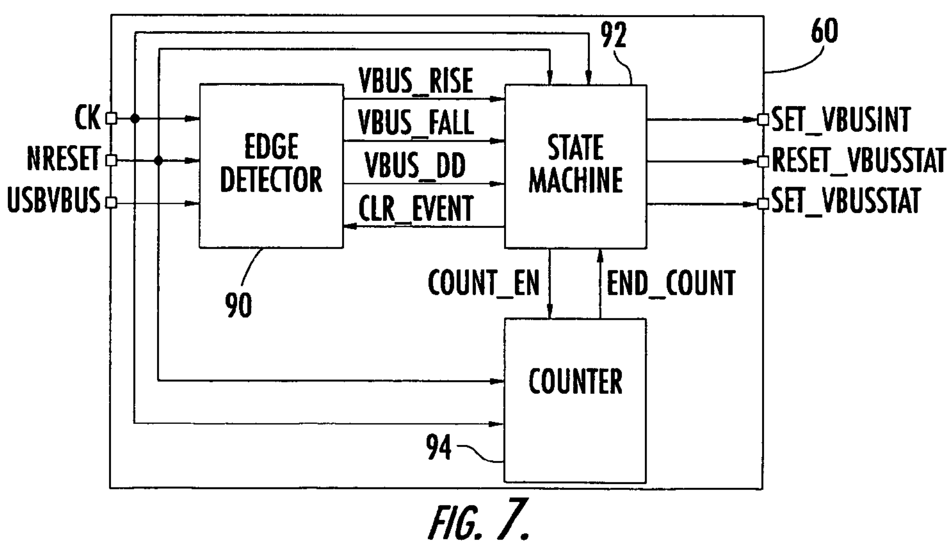
FIG. 7 is a diagram illustrating the circuit for detecting the voltage $V_{BUS}$ in accordance with the present invention.

The detection circuit 60, which shall be described in more detail below with reference to FIGS. 7 and 8, supplies a first signal set_vbusstat for setting the latch 80 to a 1 logic state when it detects a rising edge of the signal $V_{BUS}$, and a second signal reset_vbusstat for setting the latch 80 to a 0 logic state when it detects a falling edge of the signal $V_{BUS}$. The rising edge and the falling edge are those of the signal supplied by the circuit 30. The detection circuit 60 supplies a third signal set_vbusint which sets the latch 76 (ITVBUS) of the interrupt state register 62 (ISR) to a 1 logic state.

The logic circuit 70 comprises an inverter circuit 74 whose input terminal is connected to the output terminal of latch 80 of register 68 (SR). The latch 70 also comprises an inverting OR circuit 72 of which one of the two input terminals is connected to the output terminal of the inverter circuit 74. The other input terminal is connected to the output terminal of latch 36 (PDWN) of control register 38 (CR). Latch 36 is set to a 0 logic state (PDWN=0) during the initialization phase (FIG. 5) of the microcontroller MC, which signifies that the regulator 26 can be turned on.

This initialization phase (FIG. 5) comprises the start operation 90, the setting to a 0 logic state operation 92 and the end operation 94. In contrast with the prior art device, there is no loop 48 (FIG. 2). Latch 78 is set to a 1 or 0 logic state by the microcontroller MC to indicate whether or not it requires knowledge of latch 76.

The detection circuit 60 comprises (FIG. 7) a detection circuit 90 for detecting a rising edge and a falling edge of the signal supplied by the Schmitt trigger type of electronic device 30. The detection circuit 60 also comprises a state machine 92 and a counter 94. These different elements 90, 92 and 94 receive from the microcontroller MC a clock signal ck and a reset to zero signal nreset for producing the synchronization.

The detection circuit 90 further receives the signal usb-$V_{bus}$ via circuit 30, and supplies the following three signals to the state machine 92. These signals are Vbus_rise corresponding to the detection of a rising edge, Vbus_fall corresponding to the detection of a falling edge, and Vbus_dd corresponding to the detection of a rising edge or a falling edge.

The detection circuit 90 receives from the state machine 92 a signal clr_event which indicates that the signal Vbus_rise or Vbus_fall has been acknowledged and can be reset to zero. The detection circuit 92 supplies the three signals defined above: set_Vbusint, reset_vbusstat and set_vbusstat.

The counter 94 measures the time period which elapses after the detection of the rising edge or falling edge, starting from the appearance of a signal count_en corresponding to a change of state of the terminal $V_{BUS}$. When the counter has reached a certain predetermined value, this signifies that the change of state is stable and can be acknowledged by the state machine 92 which then receives the signal end_count.

Figure 8:
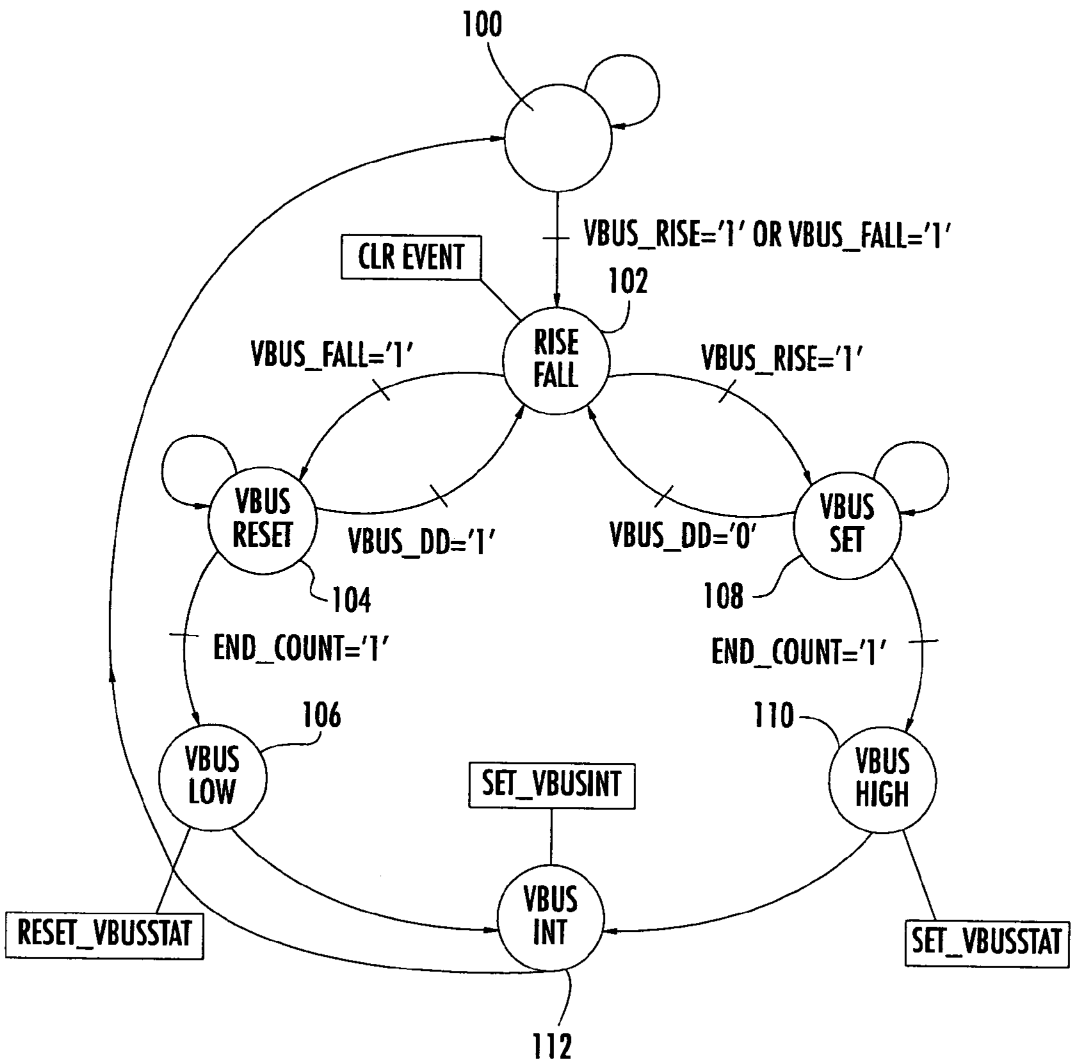
FIG. 8 is a flow chart illustrating the operation of the sate machine used in the detection circuit for detecting the voltage $V_{BUS}$ in accordance with the present invention.

The state machine 92 operates in accordance with the flow chart of FIG. 8. State 100 corresponds to a wait state of the machine. As soon as the detection circuit 90 supplies a signal Vbus_rise=1 or Vbus_fall=1, the state machine passes to a state 102 for resetting the different circuits to the 0 logic state.

In the case where the signal is Vbus_fall=1, the machine passes to state 104 (Vbus_reset) which indicates an edge falling to the low level. If this low level is confirmed by the signal end_count=1 of counter 94, the machine passes to the state 106 which supplies the output signal reset_vbusstat for setting the latch 80 of the state register 68 to a 0 logic state.

In the case of a signal Vbus_rise=1, the machine passes to the state 108 (Vbus_set) which indicates an edge rising to the high level. If this high level is confirmed by the signal end_count=1 of counter 94, the state machine passes to the state 110 that supplies the output signal set_vbusstat for setting the latch 80 of the state register 68 to the 1 logic state.

In the two cases presented above, the state machine 92 passes from one of the states 106 and 110 to the state 112 which supplies the signal set_vbusint applied to the latch 76 of the interrupt state register 62. In these two cases, the state machine returns from the state 104 to the state 102 if the signal Vbus_dd=1, i.e., if a signal Vbus_rise=1 appears, and from the state 108 to the state 102 if the signal Vbus_dd=0, i.e., if a signal Vbus_fall=1 appears.

The logic circuit 70 provides the logic function defined by the truth table of FIG. 4 between the two binary variables determined by the states of the latches 80 and 36, i.e., the values of vbusstat and PDWN. This truth table shows that the regulator 26 is functioning only if the terminal $V_{BUS}$ is powered by the USB connecting cable.

That which is claimed is:

1. A control device, in a first peripheral apparatus, for controlling a first voltage applied to a first conductor wire of a universal serial bus (USB) in the first peripheral apparatus connected upstream to a second peripheral apparatus, the first peripheral apparatus comprising a supply voltage source for supplying the first voltage to the first conductor wire, and the first peripheral apparatus being connected to receive a second voltage on a second conductor wire of the USB, the control device comprising:

- a detection circuit connected to the second conductor wire of the USB for detecting the second voltage received therefrom;
- a memory connected to said detection circuit for storing a logic value corresponding to a presence or an absence of the second voltage; and
- a logic control circuit connected to said memory for operating the supply voltage source only if the stored logic value indicates that the second voltage is present, to protect the second peripheral apparatus from receiving the first voltage via the first conductor wire of the USB of the first peripheral apparatus when the second voltage is not present.

2. A control device according to claim 1, wherein said detection circuit comprises:

a Schmitt trigger having an input connected to the second conductor wire of the USB, and an output for providing an output signal;

an edge detection circuit connected to an output of said Schmitt trigger for detecting a rising edge or a falling edge of the output signal, and for producing at least one signal corresponding to the detected rising and falling edges of the output signal;

a counter connected to said edge detection circuit for counting a duration from which a logic value of the detected rising edge or of the detected falling edge of the output signal is maintained, and for producing an end of count signal when the counted duration reaches a predetermined value; and a state machine connected between said edge detector and said counter for changing logic states as a function of the detected rising edge and the detected falling edge of the output signal and as a function of the end of count signal, said state machine producing a signal having a logic value corresponding to the presence or absence of the second voltage and for producing a signal indicating that the logic value corresponding to the presence or absence of the second voltage has changed.

3. A control device according to claim 1, further comprising a state register comprising at least one latch; and wherein said memory circuit comprises said at least one latch.

4. A control device according to claim 1, wherein said logic control circuit comprises:

an inverter circuit having an input terminal for receiving the logic value corresponding to the presence or absence of the second voltage; and a NOR circuit having a first input connected to an output terminal of said inverter circuit, and a second input for receiving a logic value indicating that the supply voltage source can be operated.

5. A control device according to claim 1, wherein the first peripheral apparatus comprises a microcontroller, an interrupt state register (ISR) for the microcontroller and comprising a plurality of latches, and an interrupt mask register (IMR) for the microcontroller and comprising a plurality of latches; the control device further comprising:

a circuit for interrupting the microcontroller and comprising at least one latch from the ISR for recording a change in the logic value corresponding to the presence or absence of the second voltage, at least one latch from the IMR for recording whether the microcontroller requires knowledge of the logic value recorded in said at least one latch from the ISR, and an AND circuit having a first input connected to said at least one latch from the ISR and a second input connected to said at least one latch from the IMR, and an output for providing an interrupt request signal to the microcontroller only if there occurs a change in the logic value corresponding to the presence or absence of the second voltage and if the logic value recorded in said at least one latch from the ISR has a 1 logic value.

6. A control device according to claim 1, wherein the first conductor wire in the USB comprises a data conductor wire.

7. A control device according to claim 1, wherein said first peripheral apparatus further comprises a microcontroller; and wherein said detection circuit detects the second voltage received on the second wire of the USB during a predetermined time period.

8. A first peripheral apparatus connected upstream to a second peripheral apparatus via a universal serial bus (USB), the first peripheral apparatus comprising:

a supply voltage source connected to a first conductor wire in the USB for supplying a first voltage thereto;

a detection circuit connected to a second conductor wire of the USB for detecting a second voltage received therefrom;

a memory connected to said detection circuit for storing a logic value corresponding to a presence or an absence of the second voltage; and a logic control circuit connected to said memory for operating said supply voltage source only if the stored logic value indicates that the second voltage is present, to protect the second peripheral apparatus from receiving the first voltage via the first conductor wire of the USB when the second voltage is not present.

9. A first peripheral apparatus according to claim 8, wherein said detection circuit comprises:

a Schmitt trigger having an input connected to the second conductor wire of the USB, and an output for providing an output signal;

a edge detection circuit connected to an output of said Schmitt trigger for detecting a rising edge or a falling edge of the output signal, and for producing at least one signal corresponding to the detected rising and falling edges of the output signal;

a counter connected to said edge detection circuit for counting a duration from which a logic value of the detected rising edge or of the detected falling edge of the output signal is maintained, and for producing an end of count signal when the counted duration reaches a predetermined value; and a state machine connected between said edge detector and said counter for changing logic states as a function of the detected rising edge and the detected falling edge of the output signal and as a function of the end of count signal, said state machine producing a signal having a logic value corresponding to the presence or absence of the second voltage and for producing a signal indicating that the logic value corresponding to the presence or absence of the second voltage has changed.

10. A first peripheral apparatus according to claim 8, further comprising a state register comprising at least one latch; and wherein said memory circuit comprises said at least one latch.

11. A first peripheral apparatus according to claim 8, wherein said logic control circuit comprises:

an inverter circuit having an input terminal for receiving the logic value corresponding to the presence or absence of the second voltages; and a NOR circuit having a first input connected to an output terminal of said inverter circuit, and a second input for receiving a logic value indicating that said supply voltage source can be operated.

12. A first peripheral apparatus according to claim 8, further comprising: a microcontroller;

an interrupt state register (ISR) for said microcontroller and comprising a plurality of latches;

an interrupt mask register (IMR) for said microcontroller and comprising a plurality of latches; and a circuit for interrupting said microcontroller and comprising at least one latch from said ISR for recording a change in the logic value corresponding to the presence or absence of the second voltage, at least one latch from said IMR for recording whether said microcontroller requires knowledge of the logic value recorded in said at least one latch from said ISR, and an AND circuit having a first input connected to said at least one latch from said ISR and a second input connected to said at least one latch from said IMR, and an output for providing an interrupt request signal to said microcontroller only if there occurs a change in the logic value corresponding to the presence or absence of the second voltage and if the logic value recorded in said at least one latch from said ISR has a 1 logic value.

13. A first peripheral apparatus according to claim 8, further comprising a microcontroller; and wherein said detection circuit detects the second voltage received on the second wire of the USB during a predetermined time period.

14. A method for automatically controlling a first voltage being applied to a first conductor wire of a universal serial bus (USB) in a first peripheral apparatus connected upstream to a second peripheral apparatus, the first peripheral apparatus comprising a supply voltage source for supplying the first voltage to the first conductor wire, and the first peripheral apparatus being connected to receive a second voltage on a second conductor wire of the USB, the method comprising:

detecting in the first peripheral apparatus the second voltage received on the second conductor wire of the USB;

storing in the first peripheral apparatus a logic value corresponding to a presence or an absence of the second voltage; and operating the supply voltage source only if the stored logic value indicates that the second voltage is present based upon a comparison with the stored logic value using a logic circuit, to protect the second peripheral apparatus from receiving the first voltage via the first conductor wire of the USB when the second voltage is not present.

15. A method according to claim 14, wherein the detecting comprises:

generating an output signal from a Schmitt trigger having an input connected to the second conductor wire of the USB;

detecting a rising edge or a falling edge of the output signal, and producing at least one signal corresponding to the detected rising and falling edges of the output signal;

counting a duration from which a logic value of the detected rising edge or of the detected falling edge of the output signal is maintained, and for producing an end of count signal when the counted duration reaches a predetermined value; and using a state machine for changing logic states as a function of the detected rising edge and the detected falling edge of the output signal and as a function of the end of count signal, the state machine for producing a signal having a logic value corresponding to the presence or absence of the second voltage and for producing a signal indicating that the logic value corresponding to the presence or absence of the second voltage has changed.

16. A method according to claim 14, wherein the first peripheral apparatus comprises a state register comprising at least one latch; and wherein the logic value corresponding to the presence or absence of the second voltage is stored in the at least one latch.

17. A method according to claim 14, wherein operating the supply voltage source comprises:

inverting the logic value corresponding to the presence or absence of the second voltage; and using a NOR circuit having a first input for receiving the inverted logic value corresponding to the presence or absence of the second voltage, and a second input for receiving a logic value indicating that the supply voltage source can be operated.

18. A method according to claim 14, wherein the first peripheral apparatus comprises a microcontroller, an interrupt state register (ISR) for the microcontroller and comprising a plurality of latches, and an interrupt mask register (IMR) for the microcontroller and comprising a plurality of latches; and wherein the method further comprises:

interrupting the microcontroller by recording in the at least one latch from the ISR a change in the logic value corresponding to the presence or absence of the second voltage, recording in the at least one latch from the IMR whether the microcontroller requires knowledge of the logic value recorded in the at least one latch from the ISR, and using an AND circuit having a first input connected to the at least one latch from the ISR and a second input connected to the at least one latch from the IMR, for providing at an output an interrupt request signal to the microcontroller only if there occurs a change in the logic value corresponding to the presence or absence of the second voltage and if the logic value recorded in the at least one latch from the ISR has a 1 logic value.

19. A method according to claim 14, wherein said first peripheral apparatus further comprises a microcontroller; and wherein said detecting comprises detecting the second voltage received on the second wire of the USB during a predetermined time period.

* * * * *